United States Patent [19]

Gralak

[11] 4,006,255
[45] Feb. 1, 1977

[54] PROCESS FOR PREPARING PROTEIN SUPPLEMENTED, FLAVORED INSTANT GRITS

[75] Inventor: Bruce G. Gralak, Carpentersville, Ill.

[73] Assignee: The Quaker Oats Company, Chicago, Ill.

[22] Filed: Jan. 8, 1975

[21] Appl. No.: 597,506

Related U.S. Application Data

[63] Continuation-in-part of Ser. No. 408,865, Oct. 23, 1973, abandoned.

[52] U.S. Cl. .................. 426/72; 426/620; 426/640; 426/658; 426/641; 426/311
[51] Int. Cl.² .......................... A23L 1/30
[58] Field of Search ............ 426/311, 72, 543, 619, 426/640, 641, 541, 543, 656, 658, 650, 620

[56] References Cited

UNITED STATES PATENTS

| | | | |
|---|---|---|---|
| 3,391,001 | 7/1968 | Sair | 426/656 |
| 3,615,656 | 10/1971 | Alden | 426/533 |
| 3,642,490 | 2/1972 | Hawley | 426/459 |
| 3,664,847 | 5/1972 | Hyldon | 426/620 |
| 3,711,301 | 1/1973 | Asogawa | 426/92 |

*Primary Examiner*—Raymond N. Jones
*Attorney, Agent, or Firm*—Mathew R. P. Perrone, Jr.; Donnie Rudd

[57] ABSTRACT

Instant corn grits are prepared by a process comprising the steps: (A) admixing corn grits, critical amounts of water, and critical amounts of polysaccharide gum and vitamins and antioxidant; (B) rapidly heating the mixture to a critical temperature for a critical time period; (C) immediately drying the heated mixture in the form of a thin sheet on a drum drier; (D) collecting and comminuting the cooked dried sheet; (E) forming a moist, proteinaceous mixture, and (F) dry blending the comminuted sheet with the moist proteinaceous flavoring material to form a dry mixture, said proteinaceous flavoring comprising from 1 percent to 15 percent by weight of the blended product and said proteinaceous flavoring material having at least about 15 percent by weight protein therein.

9 Claims, No Drawings

PROCESS FOR PREPARING PROTEIN SUPPLEMENTED, FLAVORED INSTANT GRITS

CROSS REFERENCE TO RELATED APPLICATIONS

This application is a continuation-in-part of U.S. patent application Ser. No. 408,865 filed Oct. 23, 1973, now abandoned.

BACKGROUND OF THE INVENTION

1. Field of the Invention

This invention pertains to a process for producing an improved instant food product of the protein supplemented, flavored corn grits type and the product produced by such process.

2. Description of the Prior Art

An instant corn grits product has been disclosed by U.S. Pat. No. 3,664,847. The present invention discloses a way of greatly increasing the flavor of such a product while at the same time providing added nutritional value in the form of protein supplementation and vitamin content.

SUMMARY OF THE INVENTION

It is an object of this invention to produce a protein supplemented, flavored instant corn grits product which may be prepared as corn grits by the mere addition of warm water to the product in a serving bowl.

It is another object of this invention to provide a highly nutritious, flavored instant grits product which upon the addition of warm water acquires the texture and flavor characteristics of conventionally cooked corn grits and resembles blends of conventional corn grits and other products.

It is another object of this invention to produce a protein and vitamin supplemented, flavored corn grits product free of emulsifier.

It is still another object of this invention to provide a process for producing a flavored instant corn grits wherein said process does not depend upon the use of added emulsifiers.

It is still a further object of this invention to provide a process for providing a flavored instant corn grits product.

These objects are accomplished by a process which comprises admixing corn grits, critical amounts of water and critical amounts of polysaccharide gum, vitamins and antioxidant, rapidly heating the mixture to a temperature of from 71° C. to 100° C. within 30 seconds of the time the corn grits, water, and gum are substantially mixed together, immediately drying the heated mixture in the form of a thin sheet on a drum drier, collecting the dried sheet of product, comminuting it to form an instant-type product, preparing a moist proteinaceous material, and blending the grits with specified amounts of a proteinaceous flavoring material to form a dry mixture.

More particularly, the polysaccharide gums used in this invention must be capable of hydrating rapidly with the addition of water and must be edible. Edible polysaccharide gums include both true gums of vegetable origin and synthetic gums such as carboxymethylcellulose, methyl cellulose, and other cellulose derivatives which approximate the vegetable gums in physical and chemical properties. Both types of gums are acceptable for use in the invention.

"True gums" are gums of vegetable origin which are soluble in water or swell in contact with water to form viscous colloidal solutions. They are insoluble in oils, alcohol, benzene and other organic solvents.

A general classification of such gums is as follows:

A. Plant gums — dried extrudates from certain trees or shrubs in the form of tears, flakes or annular fragments that have been formed by bark fissures or incisions. The more important ones include acacia (gum arabic), Australian, Cape, carmania, gedda, ghatti, karaya, mesquite, mogadore, Persian, shiraz, talha, and tragacanth. Others of lesser importance include amrad, angico, apricot, brea, cashew, cebil, cedar, chagual, cherry, damson, jeol, mango, plum and sassa.

B. Plant mucilages — derived from seeds, roots, or other plant parts usually by extraction with water. This class includes gums derived from ahhea root, chia seed, Iceland moss, linseed (flaxseed), slippery elm bark and guar gum.

C. Mucilaginous materials known as hydrophylic colloids obtained from two general groups of brown and red algae. This class includes agar, Irish moss (carrageen) and algin.

When the source material for the gum is acidic, i.e., algin and Irish moss, the commercially available edible gum is a derivative of the acid such as a soluble salt or ester, i.e. propylene glycol ester of alignic acid. In general, to be satisfactory, any gum employed must be edible, have no undesirable flavor, and disperse rapidly in hot water.

The concentration of the polysaccharide gum is critical. The polysaccharide gum must be present in an amount of from 0.5 to 3.5 percent by weight of the finished corn grits product and preferably from 1.0 to 3.0 percent by weight of the finished corn grits product.

It is contemplated, alternatively, that mixtures of the aforementioned gums may be employed instead of a single gum as long as the critical levels of gum are maintained.

The objects of this invention are further accomplished by a process for producing a fortified, nutritious, instant-type food product which upon the addition of water and without need for heating to boiling temperatures acquires the flavor and texture characteristics of cooked corn grits, said process consisting of the steps:

A. admixing
  1. corn grits;
  2. water, said water being added in an amount sufficient to cause the moisture content to be from 30 percent to 90 percent by weight of the total mixture;
  3. an edible polysaccharide gum capable of rehydrating rapidly with the addition of water, said gum being added in an amount of from 0.5 to 3.5 percent by weight of the finished corn grits product; and
  4. a mixture of vitamins and antioxidant until the total admixture is a slurry;

B. rapidly heating the above mixture to a temperature of from 71° to 100° C. said heating being accomplished within 30 seconds of the time the corn grits, water and gum are substantially mixed together;

C. immediately drying the heated mixture in the form of a thin sheet on a drum drier, said drying being substantially accomplished within 2.5 minutes of the time the corn grits, water, and gum are substantially mixed together;

D. collecting the dried sheet of product containing discrete particles in a starch-gum matrix and comminuting the dried sheet to form an instant-type corn grits product;

E. forming a moist, proteinaceous flavoring material by admixing:
  1. a proteinaceous material having more than 15 percent by weight protein therein,
  2. salt, and
  3. a moisturizing gravy mix; and F. blending the moist, proteinaceous flavoring material with the comminuted dry sheet until the blend is dry and with said proteinaceous flavoring material being added in an amount of from 1 percent to 15 percent by weight of the blended product.

The elimination of an emulsifier in this new process is accomplished by a rapid heating step followed by an immediate drying step. The heating step of this process consists of rapidly heating the corn grits, water, and gum mixture to a temperature of from 71° to 100° C. and preferably from 93° to 100° C. with said heating being accomplished within 30 seconds of the time the corn grits, water, and gum are substantially mixed together. If the critical time period of this heating step is substantially exceeded, the starch in the corn grits will gelatinize to the extent that the mixture will become a solid mass and cannot be formed in a thin sheet on the drum drier. It is, therefore, absolutely necessary that the critical temperature-relationship be adhered to.

The rapid heating step of this new process must be followed immediately by the drying of the heated mixture in the form of a thin sheet on a drum drier. It is sufficient if a substantial portion of the heated mixture, i.e. greater than 80 percent, is dried within a time period of about 2.5 minutes from the time that the corn grits, water, and gum are substantially mixed together.

Any of the commercially available comminuting machines are acceptable for comminuting the cooked and dried sheet of discrete particles in a starch-gum matrix. It is preferred, however, that the comminution be such that the product has the following particle size distribution according to a Ro-Tap particle size distribution analysis:

| 10 minutes on Ro-Tap | |
|---|---|
| | Weight percent |
| On a No. 12 | <1 |
| Through a No. 12 and on a No. 16 | 17–25 |
| Through a No. 16 and on a No. 20 | 37–43 |
| Through a No. 20 and on a No. 30 | 14–19 |
| Through a No. 30 and on a No. 40 | 4–7 |
| Through a No. 40 | <20 |

Note: No. refers to U.S. sieve numbers.

While the above is a preferred particle size distribution for the comminuted product, any particle size distribution which will give approximately the same hydration rate as the above distribution will be acceptable.

In addition to making the product instant in nature, this unique process has provided several other benefits. First, the combination of thickening agent and critical temperature range provides a mixture which will form a sheet on a drum drier. By "drum drier" it is intended to mean any endless plate which can be heated from a side opposite the side contacted by the product. A good example of a "drum drier" which may be used in this new process may be found in U.S. Pat. No. 3,478,439. Normally, one would not attempt to use a drum drier to dry a mixture of discrete particles in a starch-gum matrix. This is so because the discrete particles would cause voids or tears in the attempted sheet, resulting in an uneven mass rather than a thin, continuous and consistent sheet which would be subjected to uniform drying and heat treatment. This unique combination of additive and temperature treatment ahs made possible the drying of the product on a drum drier which gives the desired properties of my product.

By the term "drying" as used herein, it is intended to mean reducing the water content to below 15 percent by weight.

The product, as formed on the drum drier, preferably has a thickness of from 0.015 to 0.030 inch. This can be accomplished by setting the space between the drums at from 0.15 to 0.030 inch.

Another distinct advantage of this process is that it is successful for corn grits from a wide variety of sources. Ordinarily, corn grits vary in makeup (fat content, etc.) depending on the location from which they are produced and the processing employed in making the grits. As a result of this, processes involving corn grits normally require major alteration to adjust to the changes in the grits. No such adjustment is necessary for this process regardless of the size or particle size distribution of the corn grits. While some prior processes have an emulsifier to overcome problems associated with particle size distribution of the grits, this costly and time consuming step has been made unnecessary by this new and unique process.

Still another advantage of this new combination of additive and temperature treatment becomes apparent after the product is prepared for use. When conventional corn grits are prepared in large quantities and stored on a steam table or the like to keep them warm until serving, they soon become an adhesive mass, or cake and lose the texture associated with grits. This new process, however, has provided a corn grits product wherein the forming of an adhesive mass or cake is postponed several hours. This results in a product which retains the grits texture for the longest of normal serving times for the product.

By the term "corn grits" in reference to this new improved food product, I intend to refer to particles of the endosperm of corn which have been subdivided to the extent that not less than 95 percent by weight of the particles pass through a No. 10 sieve and not more than 20 percent by weight of the particles pass through a No. 25 sieve.

By the term "instant" in reference to this food product, I intend to refer to a product which can be prepared in a bowl by mere addition of water and without a cooking step by the consumer. Thus provided is a product which eliminates the cooking pan and extensive cooking time required for conventional corn grits. While room temperature water (about 25° C.) can be added to this product to rehydrate it, it is preferred to use boiling water as this requires less time and provides a product at the temperature normally preferred.

The product of this invention is different from the product made by inclusion therein of emulsifiers. This difference is most dramatically illustrated by a comparison of the density of the two products. If the process uses emulsifiers to obtain a product, the volume of a normal 24 gram serving of the grits (before water is added to the bowl) will be about ¼ cup which is a density of about 1536 grams per gallon. The product produced by my new process, however, has a volume of about ⅓ cup for a 24 gram serving which is a density of about 1152 grams per gallon. This new product is therefore about 25 percent less dense than other known products.

This new and unique flavored product comprises a blend of the hereinabove described instant grits product with a moist, proteinaceous flavoring material. The moist, proteinaceous flavoring material comprises from 1–15 percent by weight of the blended product and the proteinaceous flavoring material has at least about 15 percent by weight protein therein. The proteinaceous flavoring material of this invention is moist. That is, it contains up to at least about 15 percent by weight moisture therein rather than being substantially dry, i.e. below 5 percent by weight moisture. It is preferable in this invention to use a vegetable protein material flavored with a meaty flavor. Primarily of importance are the hydrolyzed vegetable proteins impregnated with meaty flavors. For instance, the proteinaceous material can be prepared by mixing a blend of commonly known imitation bacon pieces with a redeye gravy mix and then with salt and mixing this mixture with the grits. Textured vegetable proteins impregnated with bacon or ham flavor are particularly useful in this invention. For use in this invention the proteinaceous material that is impregnated with a meat flavor or other proteinaceous material is mixed with salt and with a gravy. The gravy can be a redeye gravy mix which is a dried gravy with added smoked flavor, or in the case of added uncooked cheese or other such material, the gravy mixture can simply be water and starch or any moisturizing food material. Of great importance in this invention is the use of uncooked cheese as an additive. In this case the cheese cannot be cooked prior to being dry blended. When cheese is used it is crumbled and water added along with salt for moisture and mixing and then this is dry blended with the grits material to give an overall mixture. The limitations on the product are clearly defined. The flavoring ingredient must be about 1 percent by weight in order to provide sufficient flavoring in the material but it must not exceed about 15 percent by weight because it changes the texture characteristics if it gets too high. In addition, the product must be flavored with a material that imparts at least a sufficient amount of protein therein. It is required in this product that the additive portion of the product have at least 15 percent by weight protein therein. Textured vegetable proteins or hydrolyzed vegetable proteins commonly on the market generally have about 30 percent by weight protein therein although concentrates may have a much higher percentage of protein. The percentage of protein in cheese products is dependent upon the type of cheese used and generally any cheese is acceptable so long as it meets the criteria and is uncooked.

Overall, the moist gravy material adds moisture to the proteinaceous material which as a moist material is then dry blended until the overall instant grits product is dry. The resultant product is a high quality, proteinaceous material that is very highly acceptable as a food product.

The corn grits, water and polysaccharide gum are mixed with a mixture of vitamins and antioxidant in preparation of the product of this invention. It is necessary that the vitamins be admixed prior to the slurrying of the material in order to get a thorough mixture of the vitamins therein. Acceptable vitamins are vitamins C, A, and the B complexes as well as other vitamins used for supplementation of food products. Iron and other certain minerals may also be added. It is necessary, however, that any of the vitamins be mixed with an effective amount of antioxidant in order to prevent their oxidation and rancidity or decomposition in the heating step of the process. Of particular importance as antioxidants in this invention are BHA and BHT.

The unusual advantages of this process and the unique feature thereof is that the process requires that the vitamins be admixed prior to the heating step, a step which normally one would think should be at the end of the process to prevent degradation of the vitamins. On the other hand, the proteinaceous material must be prepared separately and independently as a moist product and then blended to give a dry product at the end. It is in no way obvious to give the reverse adding of vitamins at the first of the process and the protein at the end of the process and this discovery has made this new and unique invention important. It is important that the adding of the vitamins and the proteinaceous material not be in anyway deviated from or else a poor product will exist.

This new and unique process results in a product which cannot be produced more economically by any other method. Simple mixing of the ingredients fails to produce an acceptable product. Likewise, simple mixing of the ingredients and cooking in a pan or oven fails to produce an acceptable product. Also, this new and unique process eliminates the many problems associated with the necessary inclusion in the prior art of critical amounts of carefully controlled emulsifiers. This invention thus provides a new and useful product which can be produced only by this new and unique process.

This new and unique product can only be described by relation to the new and unique process which has been discovered. This new product, therefore, may best be described as the product produced by my new process.

DESCRIPTION OF PREFERRED EMBODIMENTS

This invention will be further illustrated but is not limited by the following examples and preferred embodiment. Example 1 may be taken to constitute the preferred embodiment of my invention.

EXAMPLE 1

A metering system is employed to mix corn grits, carboxymethylcellulose (CMC 7HOF, Hercules, Inc.), vitamins, iron, BHA and water at room temperature and immediately inject the mixture into a steam injector. The metering system is adjusted such that the mixture is comprised of 100 parts by weight water, 50 parts by weight corn grits, and 0.028 parts by weight carboxymethylcellulose and 0.001 parts by weight vitamins, iron, and BHA. Steam is injected rapidly into the mixture as it passes through the steam injector and within about 20 seconds of the time that the materials are mixed together the mixture has a temperature of 95° C. The mixture at 95° C. temperature is immediately deposited in the trough of a drum drier. Within about 2 minutes of the time that the mixture reaches the 95° C. temperature substantially all of the mixture is passed through the nip of the drier. The heated mixture forms a thin sheet on the internally heated rotating double drum drier and the product is then removed in a thin sheet having a thickness of about 0.025 inch and comminuted to the particle size of corn grits. A redeye gravy is prepared by conventional methods and dried to about 15 percent by weight moisture. This mix is then mixed with an imitation bacon material (a smoked, bacon-flavored, hydrolized soy protein resembling chopped fried bacon) and salt in an amount of 12 parts gravy, 12 parts protein (bacon mix) and 5 parts salt. This mix is then mixed with the dried grits in an amount of 94 parts by weight dried grits with 6 parts by weight total protein mix.

EXAMPLE 2

Example 1 is repeated with the exception that the polysaccharide gum is guar gum (Jaguar J2Sl, Stein, Hall and Co., Inc.).

EXAMPLE 3

Example 1 is repeated with the exception that the imitation bacon product was replaced with an equal amount of a bacon flavored, textured vegetable protein which is finely divided to resemble chopped, fried bacon.

EXAMPLE 4

Example 1 is repeated except that the bacon product is replaced with an equal amount of a ham flavored hydrolyzed soy protein. The ham flavored product is also finely divided to resemble small cubes of baked ham.

EXAMPLE 5

Example 1 is repeated except that the bacon is replaced with about 9 parts by weight of an imitation sausage which has about half flavoring therein with the other half comprising a textured vegetable protein.

EXAMPLE 6

Example 1 is repeated with the exception that the bacon bits is replaced with about 8 parts by weight of uncooked cheddar cheese, and the gravy is replaced with a water starchy material mixture.

In each of the above examples the product thus produced is an extremely good tasting high protein containing grits product. The product had the appearance and taste of grits mixed with another ingredient. The grits and "meat" product product thus produced is the first known example of such a product. This product is the first known instant corn grits product high in both protein content and vitamin and iron content. The unique process for this production makes this truly exceptional product possible.

Therefore it is claimed:
1. A process for producing a fortified, nutritious instant-type food product which upon the addition of water and without need for heating to boiling temperatures acquires the flavor and texture characteristics of cooked corn grits, said process consisting of the steps:
  A. admixing
    1. corn grits;
    2. water, said water being added in an amount sufficient to cause the moisture content to be from 30 percent to 90 percent by weight of the total mixture;
    3. an edible polysaccharide gum capable of rehydrating rapidly with the addition of water, said gum being added in an amount of from 0.5 to 3.5 percent by weight of the finished corn grits product; and
    4. a mixture of vitamins and antioxidant until the total admixture is a slurry;
  B. rapidly heating the above mixture to a temperature of from 71° to 100° C. said heating being accomplished within 30 seconds of the time the corn grits, water, and gum are substantially mixed together;
  C. immediately drying the heated mixture in the form of a thin sheet on a drum drier, said drying being substantially accomplished within 2.5 minutes of the time the corn grits, water, and gum are substantially mixed together;
  D. collecting the dried sheet of product containing discrete particles in a starch-gum matrix and comminuting the dried sheet to form an instant-type corn grits product;
  E. forming a moist proteinaceous flavoring material by admixing:
    1. a proteinaceous material having more than 15 percent by weight protein therein;
    2. salt, and
    3. a moisturizing gravy mix; and
  F. blending the moist proteinaceous flavoring material with the comminuted dry sheet until the blend is dry and with said proteinaceous flavoring material being added in an amount of from 1 percent to 15 percent by weight of the blended product.

2. A process according to claim 1 wherein the proteinaceous material is uncooked cheese.

3. A process according to claim 1 wherein the edible polysaccharide gum that is added is carboxymethylcellulose.

4. A process according to claim 1 wherein the edible gum that is added is guar gum.

5. A process as in claim 1 wherein the proteinaceous flavoring material is a meat flavored vegetable protein.

6. A process as in claim 4 wherein the vegetable protein is a hydrolyzed vegetable protein.

7. A process as in claim 4 wherein the vegetable protein is textured vegetable protein.

8. A product produced by the process as defined in claim 1.

9. A process as in claim 1 wherein the rapid heating step is to a temperature of from 93° to 100° C.

* * * * *